United States Patent [19]

Maldavs et al.

[11] Patent Number: 4,502,662
[45] Date of Patent: Mar. 5, 1985

[54] SHROUDED FLUID COUPLING

[75] Inventors: Ojars Maldavs; William J. Leddy, Jr., both of Lincoln, Nebr.

[73] Assignee: Imperial Clevite Inc., Glenview, Ill.

[21] Appl. No.: 466,140

[22] Filed: Feb. 14, 1983

[51] Int. Cl.³ .............................................. F16L 37/28
[52] U.S. Cl. ............................ 251/149.6; 137/533.17; 137/614.04; 137/614.05
[58] Field of Search ..................... 137/614.04, 614.05, 137/149.6, 533.17, 533.31, 614.2; 251/148

[56] References Cited

U.S. PATENT DOCUMENTS

| | | | |
|---|---|---|---|
| 2,665,928 | 1/1954 | Omon et al. | 137/614.04 |
| 3,210,056 | 10/1965 | Van't Sant | 137/533.17 |
| 3,348,575 | 10/1967 | Simak | 137/614.05 |
| 3,554,230 | 1/1971 | Berg | 137/614.04 |
| 3,570,543 | 3/1971 | Ekman | 137/614.04 |
| 4,221,235 | 9/1980 | Maldavs | 137/614.04 |

FOREIGN PATENT DOCUMENTS 580993 11/1977 U.S.S.R. .......................... 137/614.04

Primary Examiner—A. Michael Chambers
Attorney, Agent, or Firm—Russell E. Baumann

[57] ABSTRACT

A shrouded type fluid coupling is provided with a valve in the shroud for permitting fluid flow through the shroud in one direction and for preventing fluid flow through the shroud in the opposite direction.

8 Claims, 7 Drawing Figures

SHROUDED FLUID COUPLING

BACKGROUND AND SUMMARY

This invention relates to a hydraulic fluid coupling, and, more particularly, to a fluid coupling which includes a shroud for protecting the valve closure of the coupling.

The invention is an improvement to the male coupling described in U.S. Pat. No. 4,221,235. The couplings described in that patent are typically used on agricultural tractors for connecting the tractor hydraulic system with the attachable implements. With the increasing sizes of tractors, implements and hydraulic systems, the fluid flow rates are increasing accordingly. Under high flow conditions in the female-to-male direction, the valving of the couplings described in the patent can become unstable. Referring to FIGS. 1, 3, and 6 of the patent, when fluid is flowing in the right-to-left direction, fluid can flow around the ball 19, through the dimples 73, and into the cavity of the shroud 20 behind the ball 19. Under normal conditions, this poses no problem. However, on high flow hydraulic systems creating high flow velocities, the flow into the cavity behind the ball can be so great that pressure builds and forces the ball to the right against the poppet assembly 15 of the female coupling (FIG. 1). Since the poppet assembly is spring-biased, the flow forces on the ball can overcome the spring forces. This creates an unstable condition causing the parts to oscillate, vibrate, and prematurely wear.

The improvement comprises an integral shuttle valve or check valve which relieves the trapped fluid behind the ball to the downstream side of the shroud. This allows the ball to remain seated against the stop portion 67 of the shroud at all times. The shuttle valve closes the shroud cavity when fluid is flowing in the left-to-right direction from the male to the female coupling. It is important that fluid pressure not enter the cavity from this direction and force the ball to the right against the poppet assembly springs and cause the ball to close against the seat.

DESCRIPTION OF THE DRAWING

The invention will be explained in conjunction with an illustrative embodiment shown in the accompanying drawing, in which.

DESCRIPTION OF THE SPECIFIC EMBODIMENT

Figure 1:
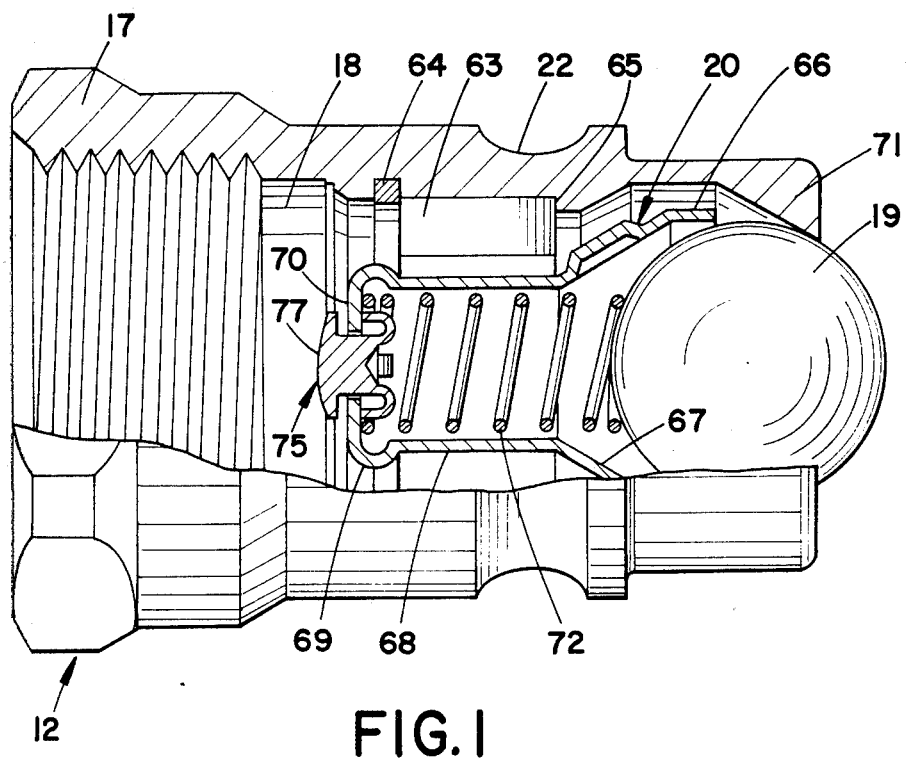
FIG. 1 is a side elevational view, partially in section, of a male fluid coupling formed in accordance with the invention.

FIG. 1 illustrates a male coupling 12 of the type which is described in U.S. Pat. No. 4,221,235. The description of that patent is incorporated herein by reference, and the reference numerals used herein correspond to the reference numerals of the patent.

The male coupling includes an outer tubular housing 17 having an internal bore 18 and a valve closure or ball 19 which is retained within a shroud 20. A groove 22 is provided in the housing for receiving the locking balls of a female coupling. The shroud is mounted within the housing by a spider support 63, the legs of which are retained between a stop ring 64 (FIG. 1) and a shoulder 65 on the housing. The shroud includes a cylindrical forward portion 66 which has an open end and an inside diameter slightly greater than the diameter of the ball 19, a frusto-conical portion 67, a cylindrical intermediate portion 68 which is retained within the collar of the spider support, and a radially enlarged rear portion 69 which provides a rear end 70.

The ball is resiliently biased into engagement with a seat 71 at the forward end of the male housing by a spring 72 which is compressed between the ball and the rear end of the shroud. As will be explained more fully hereinafter, the ball is movable away from the valve seat to its open position illustrated in phantom in FIG. 2 in which it engages the frusto-conical portion 67 of the shroud. However, fluid passages are provided by radially outwardly extending enlargements or dimples 73 in the frusto-conical portion which permit fluid to flow behind the ball to provide quick closing when the couplings are disconnected. The cylindrical forward portion of the shroud is slightly larger than the ball to permit fluid flow therebetween while still providing good guiding action for the ball to maintain the ball substantially centered with respect to the valve seat 71.

An opening 74 is provided in the rear end 70 of the shroud, and a shuttle or spool 75 is slidably mounted in the opening. The shuttle includes a cylindrical central portion 76, a radially enlarged disc-like rear end portion 77, and a forward end portion 78 which includes, for example, four circumferentially spaced rearwardly curved legs 79.

The diameter of the central portion 76 is less than the diameter of the opening 74 in the shroud, and when the legs 79 engage the rear end 70 of the shroud, fluid can flow between the legs and through the opening 74. The disc 77 includes a flat forward surface 80, and when this flat surface engages the flat rear end of the shroud, fluid flow from left to right through the opening 74 is substantially prevented.

Figure 2:
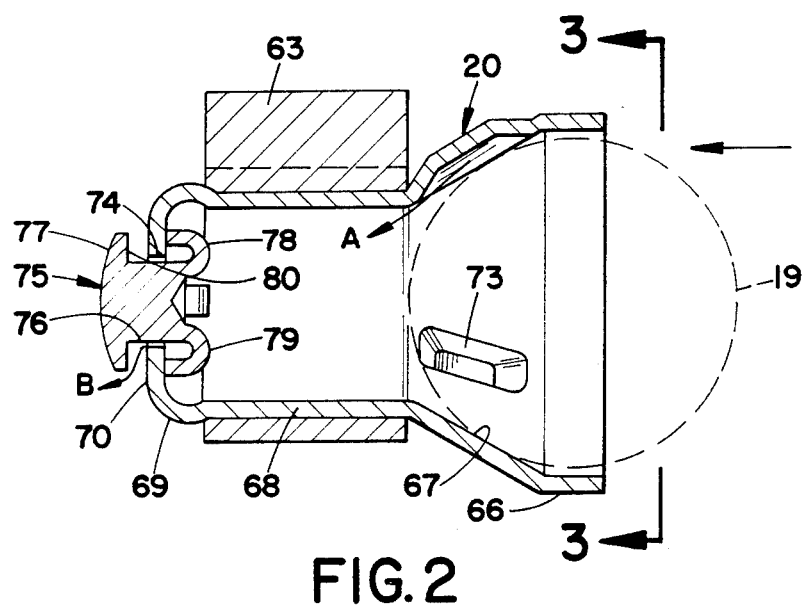
FIG. 2 is a sectional view of the shroud of the coupling when fluid is flowing from right to left.
Figure 3:
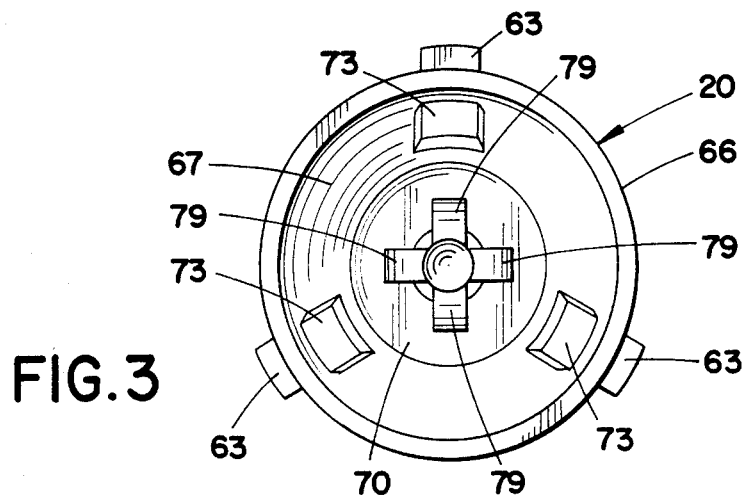
FIG. 3 is an end view of the shroud taken along the line 3—3 of FIG. 2.
Figure 4:
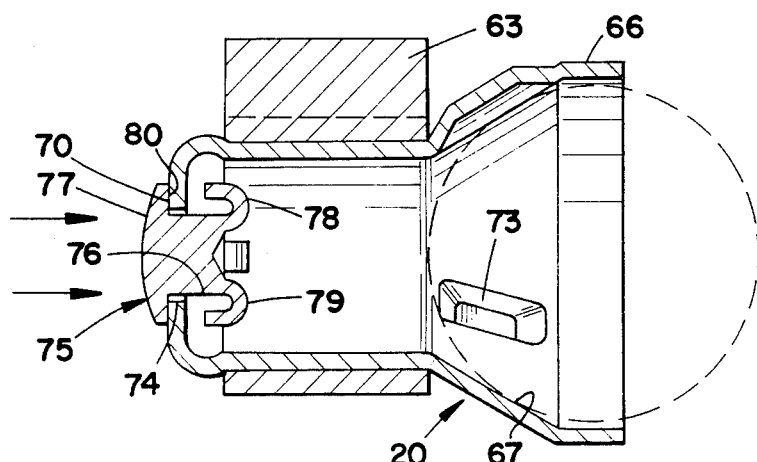
FIG. 4 is a view similar to FIG. 2 when fluid is flowing from left to right.
Figure 7:
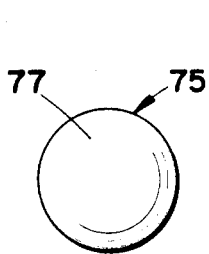
FIG. 7 is an end view of the shuttle valve taken from the other end.
Figure 5:
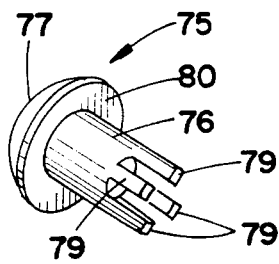
FIG. 5 is a perspective view of the shuttle valve.
Figure 6:
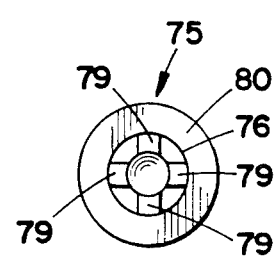
FIG. 6 is an end view of the shuttle valve.

In operation, the male coupling is connected to the female coupling, for example, a female coupling of the type described in U.S. Pat. No. 4,221,235. When the couplings are connected, the ball 19 is seated against the frusto-conical portion 67 of the shroud as shown in FIGS. 2 and 4. The ball 19 is shown in phantom in FIGS. 2 and 4, and the spring 72 is omitted for clarity. When fluid is flowing from the female coupling to the male coupling, i.e., from right to left in FIG. 2, fluid can flow past the ball 19 through the dimples 73 as indicated by the arrow A and forces the shuttle valve 75 to the left so that the legs 79 engage the rear end wall 70. The fluid flows between the legs and through the opening 74 as indicated by the arrow B. The shuttle valve thereby relieves excessive pressure within the cavity of the shroud behind the ball, and the fluid pressure within the cavity will not increase to the point at which the ball will be forced to the right.

On the other hand, when the fluid is flowing from the male coupling to the female coupling, i.e., from left to right in FIG. 4, the fluid forces the disc 77 against the end wall 70 and closes the opening 74. The shroud therefore protects the ball 19 from surges in fluid pressure and prevents the ball from being forced to the right.

In either case, when the couplings are disconnected the pressure on opposite sides of the ball 19 is equalized by the flow of fluid through the dimples 73. The ball is thereby urged against the valve seat 71 (FIG. 1) by the spring 72 without being retarded by fluid pressure.

While in the foregoing specification a detailed description of a specific embodiment of the invention was set forth, it will be understood that many of the details herein given may be varied considerably by those skilled in the art without departing from the spirit and scope of the invention.

We claim:

1. In a fluid coupling having a housing, a valve seat, a movable valve closure member within the housing engageable with the valve seat, and a generally tubular shroud within the housing for protecting the valve closure member from surges of fluid in operation having a first open end in which the valve closure member is positioned and a second end, the improvement comprising valve means in said second end of the shroud for permitting fluid to flow through the shroud in one direction and for preventing fluid from flowing through the shroud in the other direction.

2. The structure of claim 1 in which said valve means comprises a spool having a central portion movably mounted in an opening in the second end of the shroud and a pair of end portions engageable with said second end, one of said end portions being provided with means for permitting fluid to flow through the opening in the second end of the shroud when said one end portion engages the second end of the shroud and the other of said end portions preventing fluid flow through the opening in the second end of the shroud when said other end portion engages the second end of the shroud.

3. The structure of claim 2 in which said one end portion of said spool includes a plurality of circumferentially spaced legs engageable with the second end of the shroud, the spaced legs providing openings through which fluid can flow when the legs engage said second end.

4. In a fluid coupling having a housing providing a valve seat adjacent one end of the housing, a valve closure member within the housing movable between a closed position in which the valve closure engages the valve seat and an open position in which the valve closure member is spaced from the valve seat, a generally tubular shroud mounted in the housing for protecting the valve closure member in operation from surges of fluid toward said one end of the housing, the shroud having an open end in which the valve closure is positioned and a second end, the improvement comprising valve means mounted in a fluid opening in the second end of the shroud for permitting fluid to flow in one direction through the shroud from the open end through the fluid opening and for preventing fluid from flowing through the fluid opening in the opposite direction.

5. The structure of claim 4 in which said valve means comprises a spool having a central portion movably mounted in an opening in the second end of the shroud and a pair of end portions engageable with said second end, one of said end portions being provided with means for permitting fluid to flow through the opening in the second end of the shroud when said one end portion engages the second end of the shroud and the other of said end portions preventing fluid flow through the opening in the second end of the shroud when said other end portion engages the second end of the shroud.

6. The structure of claim 5 in which said one end portion of said spool includes a plurality of circumferentially spaced legs engageable with the second end of the shroud, the spaced legs providing openings through which fluid can flow when the legs engage said second end.

7. In a fluid coupling having a housing, a valve seat, a movable valve closure member within the housing engageable with the valve seat, and a shroud within the housing for protecting the valve closure member from surges of fluid in operation, the improvement comprising valve means on the shroud comprising a spool having a central portion movably mounted in an opening in the shroud and a pair of end portions engageable with the shroud about said opening, one of said end portions being provided with means for permitting fluid to flow through the opening in the shroud when said one end portion engages the shroud and the other of said end portions preventing fluid flow through the opening in the shroud when said other end engages the shroud whereby the shroud permits fluid to flow through the shroud in one direction and prevents fluid from flowing through the shroud in the other direction.

8. The structure of claim 7 in which said one end of said spool includes a plurality of circumferentially spaced legs engageable with the shroud, the spaced legs providing openings through which fluid can flow when the legs engage the shroud.

* * * * *